US006368218B2

(12) United States Patent
Angell, Jr.

(10) Patent No.: US 6,368,218 B2
(45) Date of Patent: Apr. 9, 2002

(54) INTERACTIVE GAMING SYSTEM

(75) Inventor: Robert C. Angell, Jr., West Greenwich, RI (US)

(73) Assignee: Gtech Rhode Island Corporation, West Greenwich, RI (US)

( * ) Notice: Subject to any disclaimer, the term of this patent is extended or adjusted under 35 U.S.C. 154(b) by 0 days.

(21) Appl. No.: 09/181,524

(22) Filed: Oct. 28, 1998

(51) Int. Cl.[7] .......................... A63F 13/00; A63F 9/24; G06F 17/00; G06F 19/00

(52) U.S. Cl. ............................ 463/40; 463/10; 463/16; 463/17; 463/19; 463/25; 463/42; 273/269; 273/139; 273/453; 273/454; 273/460

(58) Field of Search ............................ 463/40, 10, 16, 463/17, 18, 19, 20, 21, 22, 25, 28, 42; 273/454, 143 R, 453, 269, 139, 460

(56) References Cited

U.S. PATENT DOCUMENTS

| | | | | |
|---|---|---|---|---|
| 5,042,809 A | | 8/1991 | Richardson | 273/138 A |
| 5,282,620 A | | 2/1994 | Keesee | 273/138 A |
| 5,286,023 A | | 2/1994 | Wood | 273/138 A |
| 5,324,035 A | * | 6/1994 | Morris et al. | 273/138 A |
| 5,398,932 A | | 3/1995 | Eberhardt et al. | 273/138 A |
| 5,401,024 A | | 3/1995 | Simunek | 273/138 A |
| 5,407,199 A | | 4/1995 | Gumina | 273/139 |
| 5,536,016 A | | 7/1996 | Thompson | 273/269 |
| 5,569,082 A | | 10/1996 | Kaye | 463/17 |
| 5,624,119 A | | 4/1997 | Leake | 273/269 |
| 5,639,088 A | | 6/1997 | Schneider et al. | 273/138.2 |
| 5,709,603 A | | 1/1998 | Kaye | 463/17 |
| 5,769,714 A | | 6/1998 | Wiener et al. | |
| 5,772,511 A | | 6/1998 | Smeltzer | 463/17 |
| 5,797,794 A | | 8/1998 | Angell | 463/18 |
| 5,800,269 A | | 9/1998 | Holch et al. | 463/42 |
| 5,830,067 A | * | 11/1998 | Graves et al. | 463/40 X |
| 5,964,660 A | * | 10/1999 | James et al. | 463/1 X |
| 5,996,997 A | * | 12/1999 | Kamille | 273/139 X |

FOREIGN PATENT DOCUMENTS

| | | |
|---|---|---|
| WO | WO 94/12256 | 6/1994 |
| WO | WO 97/27921 | 8/1997 |
| WO | WO 98/26361 | 6/1998 |
| WO | WO 98/36809 | 8/1998 |

OTHER PUBLICATIONS

International Search Report for International Application No. PCT/US 99/23000, filed Jan. 10, 1999.0.

International Search Report for International Application No. PCT/US 99/23000, filed Jan. 10, 1999.

Pending U.S. Patent Application, Ser. No. 08/923,653, filed Sep. 4, 1997, , "Technique for Secure Network Transactions".

* cited by examiner

*Primary Examiner*—Joe H. Cheng
*Assistant Examiner*—Binh-An D. Nguyen
(74) *Attorney, Agent, or Firm*—Edwards & Angell, LLP; Peter J. Manus; Steven M. Jensen

(57) ABSTRACT

A method and system for gaming is provided in which a plurality of players each connect to a host which enables players to participate jointly in the same games of chance. According to one embodiment, a computerized method of gaming is provided that includes connecting a plurality of players to a host remotely located from the plurality of players. Each player jointly participates in a turn-based game of chance.

13 Claims, 3 Drawing Sheets

INTERACTIVE GAMING SYSTEM

BACKGROUND OF THE INVENTION

Playing a game of chance, including lotteries and instant ticket games, typically involves a player traveling to a local outlet at which such tickets are available to purchase a ticket. Most lotteries involve purchasing a ticket in which it is determined at a scheduled drawing in the future whether the ticket is a winner.

Another type of lottery game, instant ticket games, usually are played by uncovering play data beneath an opaque material by rubbing the material off with a coin for example. A basic instant ticket game involves uncovering matching numbers or dollar amounts in order to win. Various other types of games are also played on instant tickets, for example, casino games such as blackjack or poker, or sports games.

Computerization has offered additional gaming options. Some lotteries enable players to purchase "tickets" over the internet, avoiding the need to travel to an outlet to purchase physical tickets. Computerized instant ticket games also exist, in which a player can play a ticket by electronically removing covered areas on a screen icon, with the basic "win" principles of the game being carried over from the physical ticket versions.

It is an object of the present invention to provide an improved computerized system and method for gaming.

SUMMARY OF THE INVENTION

A method and system for gaming is provided in which a plurality of players each connect to a host which enables players to participate jointly in games of chance.

According to one embodiment, a computerized method of gaming is provided that includes connecting a plurality of players to a host remotely located from the plurality of players. The method further includes each player jointly participating in a turn-based game of chance.

According to another embodiment, a computerized method of gaming is provided that includes assigning each of a plurality of players at least one electronic instant ticket, and each player taking turns uncovering concealed areas on the electronic instant tickets.

Accordingly to another embodiment, a computerized gaming system is provided that includes a host, and a plurality of players remotely located from the host connected to the host. The players jointly participate in a turn-based game of chance.

BRIEF DESCRIPTION OF THE DRAWINGS

The invention will be better understood and appreciated from the following detailed description of illustrative embodiments thereof, and the accompanying drawings, in which.

DETAILED DESCRIPTION

Figure 1:
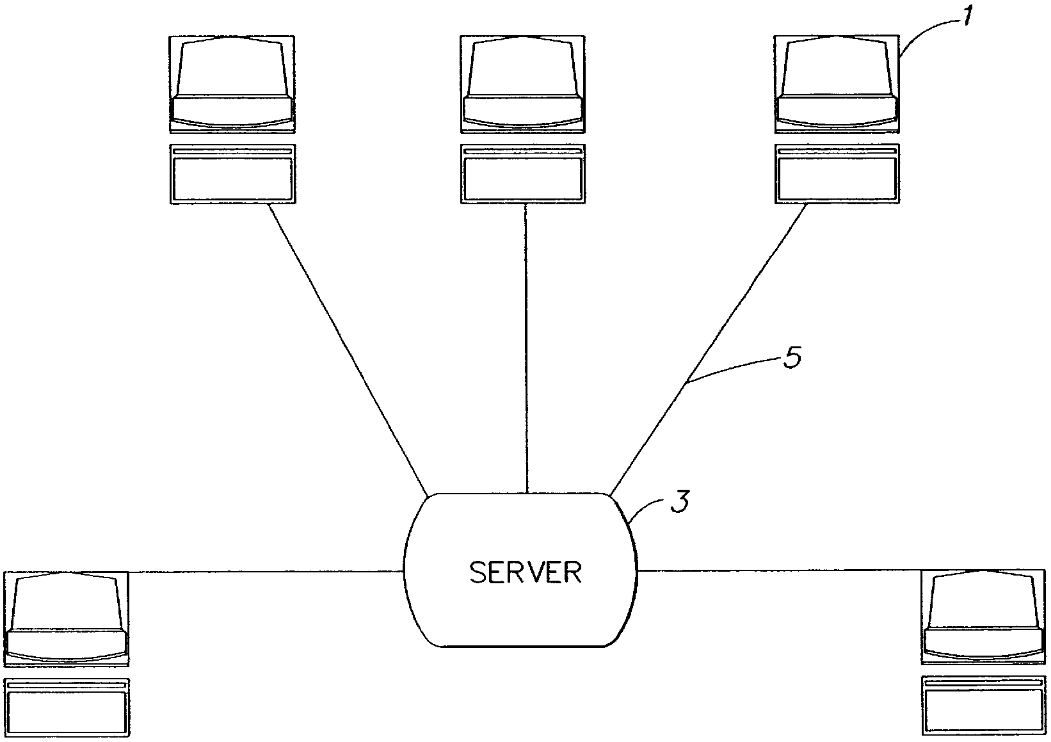
FIG. 1 shows a computerized gaming system according to one embodiment.

FIG. 1 shows a computerized gaming system according to one embodiment of the present invention. The system includes a plurality of clients 1, for example, personal computers, coupled to a host server 3. Connection 5 can be a via a local or wide area network, a point to point network provided by telephone services, or other communication network. According to one embodiment, the clients (hereinafter "players") are users of home personal computers coupled to host server 3 via an internet connection 5. Thus, the foregoing system enables a player to connect to server 3 remotely (for example, from the player's home) to play games of chance supported on the server.

The server 3 is a computer system that can support a variety of lottery games which can be played remotely at different times and simultaneously by players 1. The server can be of a conventional design and include a processor connected to one or more storage devices, as well as communications devices for establishing connections 5 to players 1. It should be understood that the invention is not limited to a particular computer system platform, processor, operating system, or network.

Figure 2:
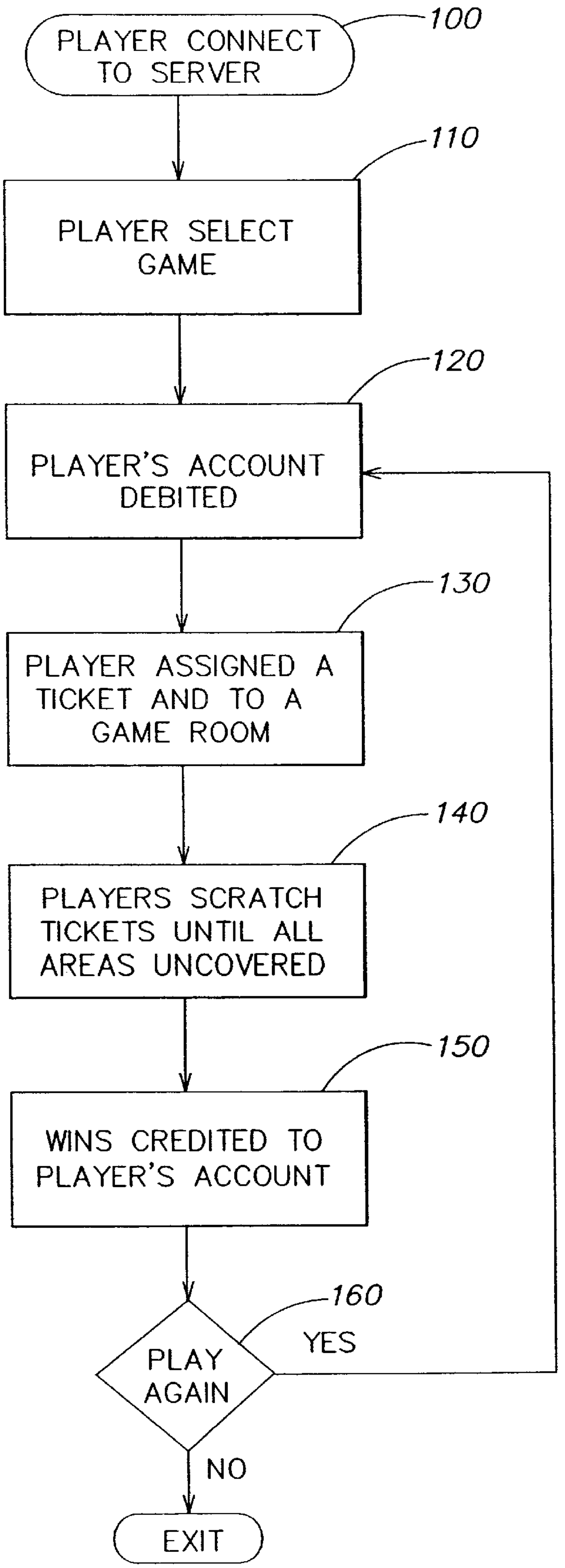
FIG. 2 shows a method of gaming according to one embodiment which can be played on the gaming system of FIG. 1.
Figure 3:
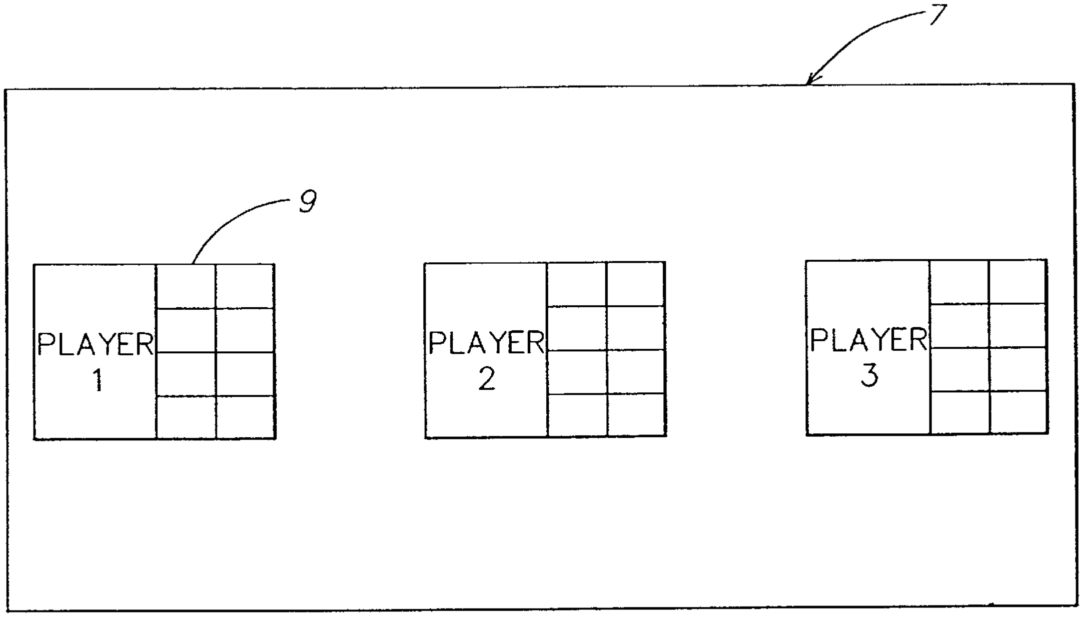
FIG. 3 shows a screen icon according to one embodiment that is displayed on each player's screen when playing the method of gaming of FIG. 2.
Figure 4:
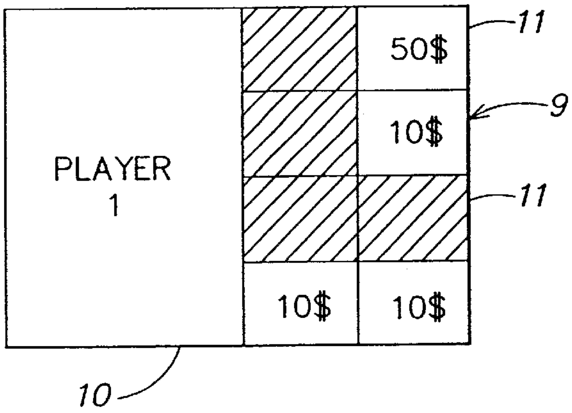
FIG. 4 shows an enlarged version of an electronic instant ticket shown in the screen icon of FIG. 3.

FIGS. 2–4 show a gaming method and screen icons according to a specific embodiment of a game supported by server 3 for play by players 1. The game is an electronic version of a type of instant scratch ticket game. The game offers the opportunity for a plurality of players to interact with one another by jointly playing in the same game.

As shown in FIG. 2, to play the game a player connects to the server in step 100. This can be achieved, for example, by the player connecting to an internet site supported by server 3. In step 110, the initial page of the site offers the player the option of playing the instant ticket game. Once the player selects the instant ticket game option, the player's previously established account is debited the amount of the ticket (step 120) and assigned a ticket (step 130). The debiting of account and the assigning of the ticket occur substantially simultaneously, but either can occur first.

Prior to selecting to play the instant ticket game, the server can provide an option for establishing an account for the player, for example, by the player entering a bank account or credit card number. Players 1 each establish an account with the server which can be debited and credited during play. For example, a player can authorize monies to be withdrawn electronically from their bank account to their game account, and any amounts won to be transferred to said account. The player is assigned a log-in password to maintain security over the player's account. The server stores a running account which may be replenished/transferred to/from the player's bank account.

After "paying" for the ticket by debiting the player's account the amount of the ticket, the server assigns a ticket to the player, and the player is assigned to a game room (similar to an internet chat room). All tickets and the scratch area symbols are assigned from a data file that resides on the server. The assignment process performed by the server can be random, sequential or by player selection.

The game room is occupied with other players who have also connected to server 3, selected the instant ticket game and been assigned tickets. All the players in the room jointly play the instant ticket game of the present invention. Alternatively, the gaming method can include the option of entering the room as a spectator.

The game is similar to a conventional instant ticket game, yet also provides the excitement of multi-player interaction. FIG. 3 shows the screen icon 7 displayed at each player's user interface (transmitted from server 3) when they enter the room to play the game. The screen icon 7 shows a plurality of tickets 9 corresponding to the tickets assigned to each player playing the game. In this example, three players are playing the game, each player having a different ticket. Of course, more or fewer players can participate in a game.

FIG. 4 shows an enlarged view of an individual ticket 9. The ticket includes an area 10 in which an ID assigned to or selected by the player is displayed. The player's name or other identifier could be displayed. A ticket graphic indicating the type of game being played can also be displayed in area 10. The ticket 9 of FIG. 3, which has been partially played, includes eight play areas, or cells, 11. Although eight play areas are shown, it should be understood that any number of play areas 11 can be employed. The ticket is played by the player using a mouse to click on individual play areas to uncover concealed play data. In the embodiment shown, clicking on concealed areas 11 reveals dollar amounts.

In step 140 (FIG. 2), the players scratch tickets by turn until all covered areas on tickets 11 are uncovered. Game play progresses in a turn-based manner, with players being given turns to scratch off one of the areas 11 on any of the available tickets. Players may elect to scratch an area on their own ticket or they may elect to scratch an area on another player's ticket. Each player receives eight turns (if there are eight play areas 11 on the tickets) during the course of the game so that all of the areas are uncovered. The ordering of the players' turns may be done randomly in a round-robin fashion or in some other manner which is equitable to all players. A number of sample games are shown below in Table 1 for a three player, three ticket, and three scratch-play-area-style game:

TABLE 1

| Turn | Game 1 | Game 2 | Game 3 | Game 4 |
|---|---|---|---|---|
| 1 | P1; S 1.3 | P 2; S 1.3 | P1; S 1.3 | P 1; S 1.3 |
| 2 | P 2; S 2.1 | P 3; S 2.1 | P 2; S 2.1 | P 1; S 2.1 |
| 3 | P 3; S 3.1 | P 1; S 3.1 | P 3; S 3.1 | P 2; S 3.1 |
| 4 | P 1; S 1.2 | P 2; S 1.2 | P 1; S 1.2 | P 1; S 1.2 |
| 5 | P 2; S 2.2 | P 3; S 2.2 | P 2; S 2.2 | P 3; S 2.2 |
| 6 | P 3; S 3.2 | P 1; S 3.2 | P 3; S 3.2 | P 3; S 3.2 |
| 7 | P 1; S 1.1 | P 2; S 1.1 | P 1; S 1.1 | P 2; S 1.1 |
| 8 | P 2; S 2.3 | P 3; S 2.3 | P 2; S 2.3 | P 2; S 2.3 |
| 9 | P 3; S 3.3 | P 1; S 3.3 | P 3; S 3.3 | P 3; 5 3.3 |

The turn column represents the sequence of turns in the game. For each of the games, the Px represents which of the three player's turn it is. The Sx.y represents the move that the player selects in terms of ticket x, scratch area y. For example, P 1; S 1.3 indicates that player 1 elects to scratch ticket 1, scratch area 3. Game 1 shows a game in which all three players elect to scratch only their own tickets. Game 2 shows a game in which Player 2 elects to scratch Player 1's ticket, Player 3 elects to scratch Player 2's ticket and Player 1 elects to scratch Player 3's ticket. In Game 3 the players get turns in random order, although all three get turns. Players may scratch somewhat random scratch areas; sometimes areas on their own tickets, sometimes areas on other tickets.

To win a particular dollar amount, a player uncovers a final required symbol (third) matching dollar amount on a particular ticket. Accordingly, in the ticket shown in FIG. 4, the player who clicked on the third matching amount won $10.00 (except if it is another player's ticket as described below). The game is complete when all eight areas are revealed on all of the tickets in a game. Although the foregoing embodiment acknowledges a "win" when three matching symbols are uncovered, more or less matching symbols may be required for a "win."

The information regarding what prize amount appears under each scratch area may only be provided, for example, to each client/player when the scratch occurs (click). Thus, for the game to be interactive, the act of one player clicking on a scratch area is conveyed to all of the other players via the server so that all players are displayed the area uncovered by another player.

Because the game is interactive, players wait for each other to take turns uncovering areas 11. Accordingly, the server may provide an auto play feature so that slower inattentive players do not stop the game. A no-response timer forces an auto play feature which would continue the game for a player that is disconnected or stops responding. For example, the auto play feature can automatically play and randomly select the next scratch on the non-responding player's own card. However, this feature is not a necessity.

After the game is complete any amounts won are credited to the player's account (step 150). In step 160, each player is queried as to whether the player wishes to play again. If so, the method of gaming returns to steps 120 and 130 in which the player's account is debited the amount of another ticket and the player is assigned another ticket to play. If not, the player exits the room and is returned to the initial screen of the gaming site. An option may be included for the player to remain in the room as a spectator rather than a player.

The foregoing gaming system and method offers multiple opportunities for a player to win. For example, as stated above, a first approach to a win in the multi-player game is when a player uncovers a third like amount on a ticket, that player wins the amount. For example, if the player takes a turn and selects a ticket that has been previously been selected by other players and revealed two $5.00 symbols, two $10.00 symbols, and one $50.00 symbol, the player will win if either a $5.00 or a $10.00 symbol is uncovered.

A second way to win is for the player to make three selections of the same amount across any of the tickets. A third way to win is for a player to be given credit for having a third matching symbol uncovered on the player's ticket, even if that player was not the one to uncover the third and matching amount. For example, as stated above, if a player uncovers a scratch area on the player's own ticket and displays a third of a series of matching symbols on that ticket, the player wins 100% of the prize. If the player uncovers a scratch area on another player's ticket and displays the third of a series of matching symbols on that ticket, the player win 80% of that prize—and the owner of the ticket is credited with the remaining 20% of the prize, or vice versa. Thus, credit is given to the player who owns the ticket, even if he is not the one who uncovers the matching symbol. Distribution of prizes can also be made to players who had uncovered one or more of the matching symbols before the winning symbol was uncovered.

It should be noted that the invention is not limited to the particular "matching" game and win scenarios shown and that countless variations on the specific game described are possible, as well as other types of interactive games in accordance with the invention. For example, any of the traditional non-electronic instant ticket games could be applied to the foregoing method and system. Another option is that games with fewer players than tickets could be played.

During game play, the host server 3 keeps a record of various data relating to the game play. The server 3 keeps a log of each game that includes information as to a player selecting a ticket, as well as the date and time of the selection. The host server also logs that a player has selected a scratch area, the ticket and scratch location, the date and time of the scratch is logged, the contents underneath the scratch area and whether the selection was automatic or by a player's choice. If a win occurs, it will occur on a player's turn so the amount won is part of the player's log record. Additionally, if a player wins on his turn by scratching an area on another player's ticket, the other player's log is updated to note the partial win.

As indicated in steps 140 and 150, at the completion of each game all scratch areas are uncovered and players' accounts are credited any amounts won. In step 160, each player is queried as to whether they want to play the game again, or whether they wish to exit the game room. Alternatively, there also may be an option for a player to become a spectator by remaining in the room and viewing an active game (i.e., having the screen icon of FIG. 3 displayed without playing). The spectator option also can be provided when the player initially connects to the server. When a player elects to play again in step 160, the gaming method returns to step 120 to assign the player another ticket.

Accordingly, the foregoing multi-player game enables interactive gaming in which the players are motivated to play scratch areas on their own cards as well as to play scratch areas on other player's cards. Additionally, a single player may play more than one card, allowing the player to see more occasions of wins than if they play only single card at a time by having more turns.

Having thus described certain embodiments of the present invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting.

What is claimed is:

1. A computerized method of gaming online, wherein a plurality of players are electronically connected to a worldwide computer network from corresponding remote locations, comprising the steps of:

assigning a first player a ticket in an electronic instant ticket lottery game, the ticket having a plurality of concealed areas;

assigning a second player a ticket in the lottery game, the second player's ticket having a plurality of concealed areas; and permitting said first player and said second player to play the lottery game by taking turns in sequence, each turn comprising uncovering one of the plurality of concealed areas from the first ticket or the second ticket, wherein during game play the first and second players view similar screen displays from their corresponding remote locations, the displays showing both the first ticket and the second ticket and results of each turn.

2. The method of claim 1, and further comprising the step of assigning a third player a ticket in the lottery game, the third player's ticket having a plurality of concealed areas.

3. The method of claim 2, wherein the third player takes a turn in sequence with the first and second players, and the third player's ticket is displayed with the first ticket and the second ticket.

4. The method of claim 3, wherein at least one turn includes uncovering play data from a ticket assigned to another player.

5. The method of claim 1, wherein each turn is taken in random order, round robin fashion.

6. The method of claim 1, wherein each turn is taken in a predetermined order.

7. The method of claim 1, and further comprising the step of debiting an account assigned to each player when each player is assigned a ticket.

8. A computerized gaming system for playing an electronic instant ticket lottery game over a worldwide computer network, the gaming system allowing a plurality of players to jointly participate in the lottery game, comprising:

a host server for supporting the gaming system and for assigning lottery tickets to first and second players, respectively, each of the tickets having a plurality of concealed areas;

a remote connection of the first player which operably connects a personal computer of the first player to the worldwide computer network;

a remote connection of the second player which operably connects a personal computer of the second player to the worldwide computer network;

wherein the first and second players play the lottery game by each taking a turn in sequence uncovering one of the plurality of concealed areas from one of the lottery tickets, and each personal computer displays the the lottery tickets assigned to the first and second players and results of each turn.

9. The system of claim 8, and further comprising a remote connection of a third player which operably connects a personal computer of the third player to the worldwide computer network, the third player being assigned a ticket having a plurality of concealed areas.

10. The system of claim 9, wherein the third player takes a turn in sequence with the first and second players, and the third player's ticket is displayed with the first ticket and the second ticket.

11. The system of claim 10, wherein at least one turn includes uncovering play data from a ticket assigned to another player.

12. The system of claim 8, wherein each turn is taken in random order, round robin fashion.

13. The system of claim 8, wherein each turn is taken in an order determined by the host server.

* * * * *